Sept. 28, 1954
N. J. URQUHART
2,690,390
METHOD OF REDUCING IRON OXIDES
Filed Sept. 18, 1950
2 Sheets-Sheet 1
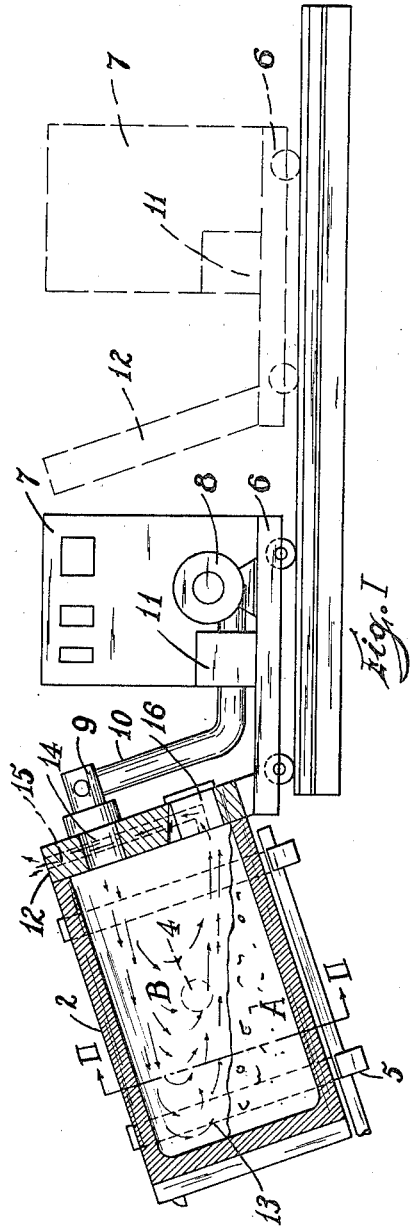
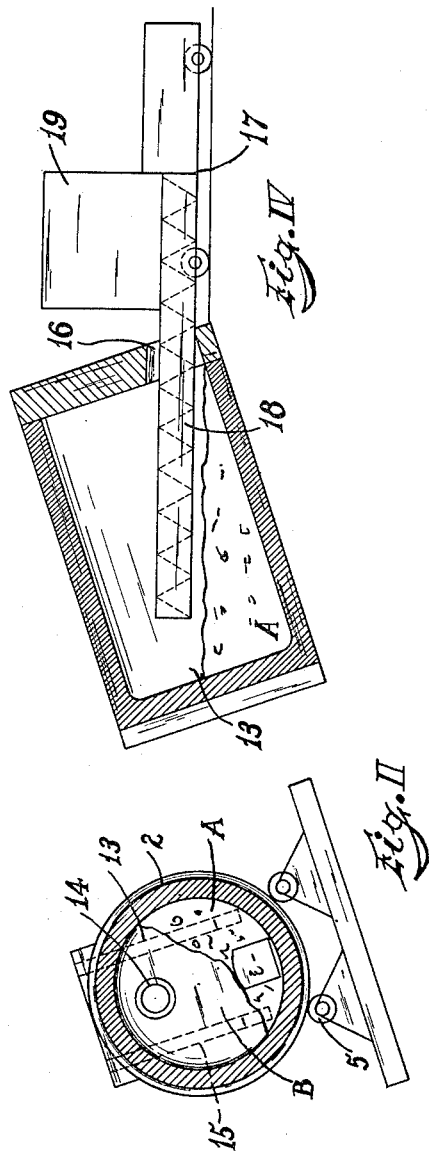
INVENTOR
Norman J. Urquhart
by William B. Wharton
his attorney Sept. 28, 1954   N. J. URQUHART   2,690,390
METHOD OF REDUCING IRON OXIDES
Filed Sept. 18, 1950   2 Sheets-Sheet 2
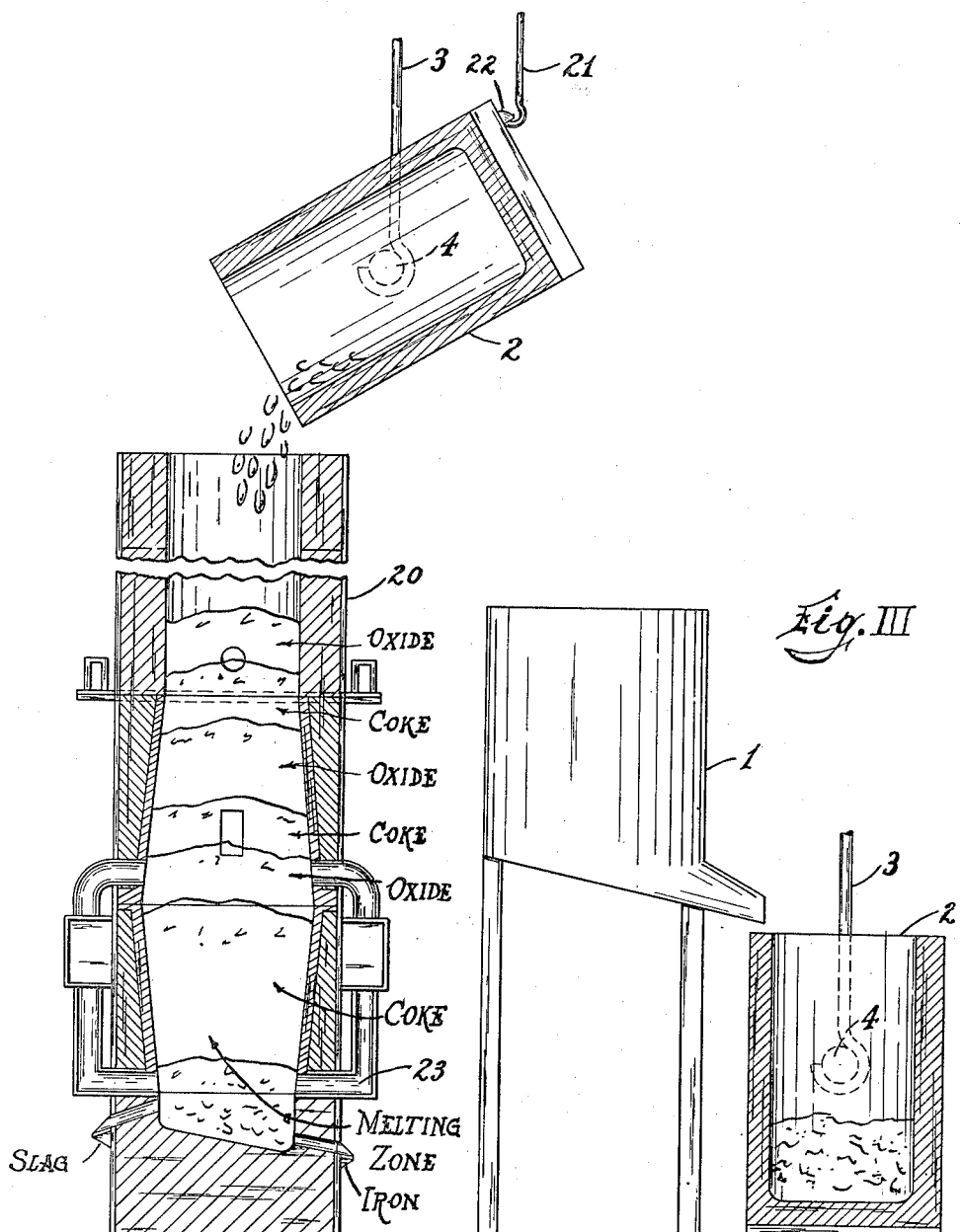
INVENTOR
Norman J. Urquhart
by William B. Wharton
his attorney Patented Sept. 28, 1954

2,690,390

UNITED STATES PATENT OFFICE 2,690,390

METHOD OF REDUCING IRON OXIDES

Norman J. Urquhart, Scenery Hill, Pa., assignor, by mesne assignments, to Combustion Processes Company, Pittsburgh, Pa., a corporation of Pennsylvania Application September 18, 1950, Serial No. 185,362

3 Claims. (Cl. 75—34)

This invention relates to the beneficiation of iron ores and to the reduction of the iron oxides thereof.

Throughout a number of years many processes have been devised to effect the direct reduction of iron oxides. In large part that development has been followed because of the great investment cost of blast furnaces and the limiting conditions which are necessary for a satisfactory blast furnace operation. It has therefore been attempted to operate in relatively small units and to perfect an operation which will yield metallic iron, or an iron oxide which is in such condition that it is susceptible to rapid and satisfactory reduction, in small unit equipment. Another consideration has been the inability of the blast furnace successfully to deal with iron ores of particular sort such as flue dusts and ores which occur in a condition of fine division.

In view of the latter problem it has been necessary in most instances to utilize an additional general treatment known as sintering. In this treatment iron ores in a condition of fine division have been subjected to heat in the presence of slag-forming additions in such manner that particles of iron oxide agglomerate within an envelope of slag. Although placing the finely divided ores in coherent masses for use as a blast furnace charge, a sintering process does not effect any appreciable reduction of the oxides in the ores which are treated and there is a tendency substantially to form fused silicates and aluminates during the process.

While largely practiced as a matter of necessity, sintering processes are uneconomical and present a required adaptation to encountered conditions rather than a positive forward step in the production of metallic iron.

Direct processes for the reduction of iron ores while in many instances ingenious and capable of producing a substantial proportion of metallic iron have failed to come into general use because of a number of diverse problems which have appeared to be insoluble by any single correlation of steps and in any coherent, economical process. One problem encountered in direct reduction of iron ores has been fuel consumption, because of the large quantity of carbonaceous material in gaseous, liquid or solid form which is required to maintain a suitable temperature and atmosphere for the reduction of the iron oxide. In processes for the direct reduction of iron ores it has been impossible to maintain the furnace charge under reducing conditions throughout the entire period of its retention in the treating furnace. While direct processes have been capable of producing metallic iron in some instances, the expense and difficulties involved in the reduction and recovery of the iron in suitable condition for further use have been commercially prohibitive.

One object of the invention is so to treat finely divided iron ores as to produce economically and efficiently reduction masses or balls having a proportionally increased Fe content and which are in condition for easy deslagging and reduction to metallic iron.

Another object of the invention is so to utilize the above reduction masses, or balls, as to obtain efficiently and economically metallic iron from further reduction in a secondary treatment, while utilizing the heat retained in the reduction balls from the initial treatment by which they are formed partially to supply heat for the secondary treatment.

Another object of the invention is to provide reduction masses, or balls, consisting largely of partially reduced iron oxide in which balls the partially reduced iron is in such condition and so associated in the reduction balls that the balls may be simply and economically cooled below a temperature at which the charge is highly reactive with oxygen, for subsequent use of the said reduction masses, or balls, in a secondary treatment.

A further and more specific object of the invention is to obtain the foregoing results effectively and economically in a treating furnace by subjecting a charge, or batch of iron ore to adequately high temperature and an oxygen-free reducing input, atmosphere throughout the entire duration of the treating period thus to conduct a continuously progressive process of reduction without intermission or reversal until the charge is discharged from the furnace.

Initially it should be explained that the process by which I obtain an improved physical form of the iron ores and effect partial reduction is a batch process. A batch process in distinction from a continuous process lends itself to the possibility of maintaining an oxygen-free reducing atmosphere in contact with the charge throughout the entire period of the treating operation. It should be emphasized that the combustion atmosphere I create is not only oxygen-free and of reducing composition, but also is obtained consistently with heat input to a treating furnace sufficient to bring the charge to a temperature adequately high for reducing the iron oxide of the ore. This is obtained by combustion of a sort in which an inner flame generating of itself substantial heat blends with low velocity air and a fuel stream in a combustion zone to produce a flame of high heating value while providing sufficient free carbon at equal temperature with the gases of the atmosphere to effect consumption of the combustion air and create an atmosphere substantially devoid of free oxygen. By pre-establishing in the furnace, in this manner, an atmosphere having a substantial content of CO and no substantial content of $O_2$ while heating the furnace charge to adequately high temperature, I am enabled to conduct a satisfactory treatment of iron ore in the furnace in a relatively short period of time and with a relatively small proportion of added carbon while effecting a treatment involving a measure of reduction without intermission or reversal. As the process continues under an input atmosphere and temperature of the above described sort and after the iron ore has been brought to reactive condition, solid carbon in consumable form such as coal low in oxygen content, or coke, suitably is added to, or present in the charge to promote and expedite the process of reduction and desirably to supply residual carbon for inclusion in the product of the treatment. For certain purposes to which the product is to be put and under certain circumstances of the treatment, such addition of carbon can be omitted if so desired but under other circumstances the addition of the solid carbon so shortens the time of treatment and is of such advantage in obtaining a product desirable for further treatment that its addition should from a practical viewpoint be made. In any event lime usually is added to react with silica and alumina in the charge. In any event the creation of a suitable temperature and atmosphere independently of added solid carbon is a primary factor in the process.

In order to maintain a reducing atmosphere substantially devoid of free oxygen in the treating chamber of the furnace, I so conduct burner operation that the above-described conditions of atmosphere and temperature are maintained in the treating chamber of the furnace. Under such conditions there is a tendency for any combustion air, which may enter with the other gases and released carbon of the burner atmosphere, to be rapidly consumed. By suitable direction of gases within the treating chamber of the furnace, the gases substantially devoid of free oxygen and having an effective content of CO and free carbon at a temperature of luminosity come in contact with the charge in the treating chamber. For maintaining an atmosphere of the requisite sort I utilize a furnace or retort closed against infiltration of air. When established, such atmosphere within the closed furnace chamber is stable and is maintainable indefinitely.

The accompanying drawings illustrate one type of apparatus suitable for conducting the method of my invention.

In the drawings:

Fig. I is a view partly in side elevation and partly in vertical section showing a treating furnace for conducting the treatment of iron ores in accordance with my invention in process of operation, and indicating in broken lines the position of the control panel and the removable firing head of the furnace as for charging or discharging the furnace.

Fig. II is a schematic cross sectional view through the treating furnace taken in the plane of section line II—II of Fig. I.

Fig. III is a schematic vertical sectional view illustrating the operation of charging the treating furnace.

Fig. IV is a schematic view partly in elevation and partly in vertical section illustrating the introduction of lime or lime and carbon into the furnace charge.

Fig. V is a schematic view illustrative of one use to which the product of my initial treatment may be put in the production of metallic iron, showing the delivery of the reduction product of the initial treatment to a cupola for the completion of the reduction.

To describe my process in detail with reference to the illustrative form of apparatus shown in the drawings, I prepare a charge of iron ore fines which may consist of hematite, magnetite, magnetite concentrates or flue dust. Such charge desirably is first subjected to elevated temperature such as a temperature from 700° F. to 1000° F. for a length of time sufficient to drive off moisture. A determined quantity of the ore then is weighed into a hopper 1 and is charged into the furnace 2 which is shown as of abbreviated tubular form open at one end. Furnace 2 then is lifted as by crane hooks 3 engaged with lifting trunnions 4 of the furnace and is placed in a position of declination from its open end on rollers 5 which may be driven in any suitable manner. A carriage 6 carrying an instrument panel 7, a blower 8 for providing low velocity air to the furnace burner 9 by way of conduit 10, control box 11 for air and fuel and the rearward closure or firing head 12 of the furnace with which the burner is mounted, is then brought into position to close the open end of the furnace.

The treating chamber 13 within the furnace desirably has been brought to high temperature, such as a temperature of from approximately 1900° F. to 2300° F. prior to charging and after the charge has been introduced and the furnace closed such temperature rapidly is restored, utilizing burner operation to provide an atmosphere of the sort described above. The burner may utilize gaseous fuel, oil or powdered coal provided it be of a sort adapted so to function as to provide the desired atmosphere. Specifically I have used a burner of the type disclosed in Urquhart Patents Nos. 2,458,541; 2,458,542 and 2,458,543, but any apparatus or arrangement which will introduce a combustion atmosphere of the described sort coupled with adequate heat input can be used. With the charge of iron ore lying in furnace chamber 13 in a pile A which is of maximum thickness adjacent the closed lower and rearward end of the treating chamber the iron ore is brought into contact with a reducing atmosphere within the approximate temperature range above noted. Throughout this heating operation the furnace gases in the free space B within the treating chamber follow the approximate course indicated by arrows in Fig. I of the drawings, passing from tunnel 14 rearwardly of the furnace and being then deflected to turn forwardly and pass along the body of iron oxide in the treating chamber. The gases escape from the furnace by way of flues 15 provided in the structure of firing head 12. It may be noted that the furnace structure does not comprise any stack extension of the flues to provide a stack draft, so the circulation of gases is under control of burner input and a positive pressure builds up within the treating chamber. That positive pressure not only assures against infiltration of air but also promotes heat penetration of the charge. In my practice I have held the pressure at from about one-half to one water inch.

It is to be understood that the furnace structure which includes the treating chamber 13 is rotated slowly during the treatment. I have found it most desirable to regulate the speed of rotation to the internal circumference of the treating chamber, to give a linear speed in the chamber of from about 8 to 25 feet of linear travel per minute. That speed is, however, appropriate to a furnace of specific size and construction used by me and to the size of the reduction balls or masses I may have chosen to produce. The limiting factor is so to rotate the furnace as to expose for heating and to the action of the atmosphere in the treating chamber all of the iron ore of the charge, while avoiding such speed of agitation as would tend to prevent the formation of coherent balls, or masses, of substantial size. As a general proposition I have found that the lower the rotational speed of the treating chamber conformable to complete exposure of the ore, the larger would be the size of the reduction balls produced in the furnace. The collection of the furnace charge in the rearward and lower end of the furnace chamber as the treatment progresses contributes to the formation of relatively large reduction masses, or balls.

There is in fact no theoretical limit to the length of time during which the charge, or batch, of ore can be subjected usefully to heat and the reducing atmosphere produced solely by combustion of the described sort. Burner input alone is capable of carrying on the process of reduction in very substantial order and any positive limit at which the treatment under those conditions ceases to be progressively effective has not been determined.

After the treatment of the charge has been conducted as above described for from about 60 to 120 minutes at a temperature within the approximate range of 1900° F. to 2300° F. and under a slight positive pressure, I am able to discharge from the furnace a product consisting of reduction balls, or masses, of substantial size as from one-half to one and one-half inches, in condition for charging into a blast furnace or for use as an ore charge in a bath type furnace. These balls, or masses are relatively heavy but somewhat porous and are of substantially decreased oxygen content and increased heat conductivity. It is to be understood that if the charge is to be removed at such stage in the operation, lime is introduced with the charge to react with silica and alumina. At a temperature of operation within the approximate range stated above a flow of slag is not produced so that the balls consist of an agglomerate of iron oxide cemented with particles of silicates and aluminates produced by reaction with the lime. After reduction has been carried to the desired stage in the described manner, the temperature can be raised sufficiently to form liquid slag without causing any undesirable results.

This product is in good condition for use as a blast furnace charge or as a lump ore for the charges or bath additions in basic open hearth steel making operations. For such uses it has the advantage of a relatively low sulphur content, such as is approximated in a further continuance of the treatment only by using a form of solid carbon of particularly high purity.

If the specific purpose of the treating operation is to obtain a product usable as a cupola melt or if it is desired to give a product for charging into a blast furnace or bath type furnace which is in a relatively advanced stage of reduction with economy in fuel cost and time, solid carbon in some suitable form is added. Such solid carbon desirably is in the form of anthracite coal, coke or a bituminous coal which has been largely freed of its oxygen-containing gases. In my practice I have used chiefly anthracite coal. Assuming that the treatment is to be conducted in such manner, the treatment of the iron ore in the input atmosphere created by burner operation alone may be considered as a preliminary treatment, to establish and maintain reducing conditions and initiate reduction.

I thus preferably introduce into the treating chamber containing the reactive charge of oxide and the described pre-existing input atmosphere an addition of solid carbon. At the time of this addition lime also can be introduced conveniently. It is desirable that the coal, or other solid carbon, and the lime be in a condition of division approximately as fine as that of the iron ore initially charged and that they be laid directly upon the ore charge in the treating chamber. With the apparatus shown, this addition can suitably be made by opening charging port 16 in the firing head of the furnace and advancing a charger 17 containing a mixture of coal and lime. As shown schematically in Fig. IV of the drawings, charger 17 carries a tubular screw conveyor 18 which is extended through charging port 16 and which delivers coal and lime from hopper 19 to the charge A in the furnace.

The total quantity of lime added during the continuance of the process desirably is apportioned to the total silica and alumina present in the charge. I have found that an addition of solid carbon even in a quantity equivalent to less than 10% of anthracite coal with respect to the total weight of the charge substantially promotes reduction of the iron oxide. Usually I prefer to make a total addition of solid carbon equivalent to about 10% to 30% of anthracite coal. It is usually desirable to have a substantial quantity of carbon present when the furnace is discharged.

It is an important element of my process that the solid carbon when added is introduced into or is quickly subjected to the above described approximately oxygen-free atmosphere. Thus the carbon when brought to reactive temperature by the input heat is not consumed by rapid combustion with atmospheric oxygen but is caused usefully to react with the oxygen of the ore fully to exercise its reducing effect. It should be understood that the burner remains in operation throughout the entire treatment and that the conditions in the treating chamber are at all times under burner control. This fact gives assurance that the input atmosphere and temperature in the treating chamber will remain substantially uniform and that the carbon will be usefully employed in effecting reduction of the ore. Under the above described reducing conditions, the temperature being within the approximate range of 1900° F. to 2300° F. and the furnace being rotated slowly, the product is in the form of coherent reduction masses, or balls, the general composition of which is quite uniform throughout the charge. The reduction balls consist of partially reduced iron oxides, a proportion of metallic iron in particulate form, a small content of free carbon particles and particles of silicate and aluminate cementing the agglomerate mass. I have found that the heat conductivity of the reduction balls has been increased over that of the original iron oxide in an order which renders the balls readily meltable in a furnace of the cupola type or bath type to give under the atmospheric conditions appropriate to the operation of those furnaces a high yield of molten metallic iron.

For any given apparatus installation, particular sort and form of iron ore which is subjected to treatment and the details of operation, the time required to obtain an optimum product will vary. Under the preferred conditions which I have employed and which are described herein I have found a total time of treatment of from about 1½ to 2½ hours adequate to obtain a product which is readily meltable in a furnace of the cupola or bath type to give a high yield of ferrous metal. The balancing of time and fuel consumed in the primary treatment and in the treatment in the secondary furnace whether such furnace be a blast furnace, cupola or bath type furnace, determines the economics of the process under all existing circumstances and the most desirable stage to which the charge is carried in the primary treatment.

In my practice conducted in pilot plant equipment I have found greater efficiency and economy in utilizing a cupola type furnace as a secondary furnace as compared with a bath type furnace. Although that preference does not necessarily carry forward into large scale production, the cupola type furnace will be used in illustrating the utility of the reduction masses, or balls, produced by my primary treatment and to describe a complete process for the recovery of metallic iron.

To describe an operation in the cupola type furnace charged with reduction masses, or balls, from my primary treatment in an initially cold condition, those reduction balls as discharged from the treating furnace desirably are coated with lime or otherwise protected against reoxidation during their cooling period. As illustrated in Fig. V of the drawings, a charge utilizing those reduction balls is made up in cupola 20 substantially in accordance with usual cupola practice, charging the furnace with coke and the reduction balls in alternating layers. In accordance with normal cupola practice the lowermost coke is ignited and heated before the first addition of reduction balls is made. If those balls have been brought to a substantial size as from about ½ inch or more at the longest axis of the ball there is such relative uniformity in size that no sizing as by hot pressing is necessary, although that expedient may be resorted to when so desired. I have employed during the progress of the melt normal cupola conditions as to air pressure, temperature and the like. Lime is added to free gangue in the oxides of the charge. Because of the distribution of silicates and aluminates in the reduction balls, slag not having been fused during the primary treatment, the slag content of the balls separates readily to flow away from the reduction masses in the furnace slightly below tuyeres 23 thereof as the melt proceeds. In my practice I have utilized tempertures of from about 2900° F. to 3000° F. and an air pressure of from about 4 to 8 water inches.

The good separation of the slag in the furnace caused by the distribution of silicates in the reduction masses from the primary treatment gives a high yield of metallic iron separated from the slag. In my process it is unnecessary to employ the expedient of crushing and magnetic separation either in preparation for the final melt or as practiced upon the slag of that melt, to recover iron from the slag. In a bath type furnace using the redutcion masses or balls for my primary treatment to replace pig iron in the furnace charge the same results are obtained, the silicates and aluminates present in the reduction masses or balls separating readily from the iron of the charge as reduction and melting take place.

Particularly in utilizing a cupola type furnace for the recovery of metalic iron in molten condition it is advantageous to charge the hot reduction masses, or balls as they come from the primary furnace directly into the secondary furnace with consequent saving in the consumption of time and fuel.

Fig. V of the drawings illustrates the dumping of the primary treating furnace 2 directly into cupola 20. As the exemplary apparatus for so doing is shown, furnace 2 is raised by crane hooks 3 and lifting trunnions 4 of the furnace and is conveyed to a position above the cupola and is tilted to discharge the reduction balls, as by engagement of auxiliary crane hook 21 with a boss or bracket 22 at the rear of the furnace. The fact that the hot product from the primary treating furnace can be directly charged into the secondary furnace for final reduction and melting is of substantial economic value and in my practice in pilot plant equipment I have found that it results in an increase of about 30% in the efficiency of the cupola.

To illustrate a complete reduction from the original iron oxide to the form of metallic iron I give the following specific illustrative examples:

Example No. 1

680 pounds of dried finely divided hematite ore preheated to 800° F. was introduced into the rotatable treating furnace, the treating chamber of which had been brought by input heat to a temperature of 1900° F. In the furnace the temperature was raised rapidly to 2180° F. and was held at that temperature for 75 minutes. At that time 90 pounds of finely divided anthracite and 30 pounds of lime were introduced onto the ore charge in the furnace and the temperature was rapidly restored to 2180° F. After treatment with continuous heat input for one-half hour, a second addition of 90 pounds of finely divided anthracite and 30 pounds of lime was made and the temperature was raised rapidly to the pre-existing level and was held for 20 minutes. During the operation the furnace was rotated at a speed to give a linear travel of about 20 feet per minute at the inner periphery of the treating chamber. During the operation the furnace gases had the following approximate composition $CO$—7%, $CO_2$—6%, $O_2$—0, with the balance of the furnace atmosphere composed of inert gases. The initial hematite ore subjected to treatment showed by analysis an Fe content of 53% and after treatment and cooling had an Fe content of 67%.

Upon discharge from the treating furnace the product masses, or balls, were coated with lime, allowed to cool for storage.

The product of the treating furnace was used as a cupola charge in the manner above described and was run into a chilled mold to form a pig when the furnace was tapped. Such pig contained no substantial quantity of slag but was a coherent body of metallic iron. When weighed the pig showed a recovery of metallic iron equal to about 96% the Fe content of the ore initially subjected to treatment.

Example No. 2

680 pounds of a magnetite concentrate in dried condition and preheated to 800° F. was introduced into the rotatable treating furnace which had been preheated to a temperature of 1900° F. The operation was identical with that described in Example No. 1 using identical quantities of anthracite coal and lime. The furnace was similarly rotated at an internal linear speed of about 20 feet per minute and the furnace atmosphere was substantially identical with the atmosphere existing in Example No. 1. As in Example No. 1 the product of the treating furnace was cooled and was introduced into the cupola in cold condition.

The magnetite ore initially subjected to treatment showed by analysis an initial Fe content of approximately 63% and after treatment and cooling showed an Fe content of approximately 74%. The pig obtained from the cupola was metallic iron in a weight showing a recovery of about 92% the Fe content of the ore initially subjected to treatment.

Example No. 3

680 pounds of dried flue dust was charged into the treating furnace which similarly was at an initial temperature of 1900° F. All the conditions, additions and timing of the treatment were identical with those described in connection with Examples Nos. 1 and 2 except that the temperature was brought to and maintained at 2240° F.

The product of this treatment similarly was cooled and charged cold into the cupola. The flue dust initially charged into the treating furnace showed by analysis an Fe content of 48% and the product of the treating furnace when cooled showed an Fe content of 59.8%. The pig obtained from the cupola showed a recovery of metallic iron equal to about 93% the Fe content of the flue dust initially subjected to treatment.

As an example of practice in which the reduction balls, or masses are charged into a cupola type furnace while still hot from the treatment by which they are produced, I give the following:

Example No. 4

680 pounds of dried finely divided hematite ore was introduced in the rotatable treating furnace the treating chamber of which had been brought by input heat to a temperature of 1900° F. In the furnace the temperature was raised rapidly to 2180° F. and was held at that temperature for 70 minutes. At that time 80 pounds of finely divided anthracite coal and 40 pounds of lime were introduced onto the ore charge in the furnace and the temperature was rapidly restored to 2180° F. After treatment for 30 minutes a second addition composed of 40 pounds of anthracite and 20 pounds of lime was made and the temperature was again restored. At that time a third addition composed of 40 pounds of anthracite and 20 pounds of lime was made and after restoration of temperature to the pre-existing level the treatment was continued for an additional period of 30 minutes.

The atmospheric conditions in the treating chamber were identical with those existing in the treatment of Example No. 1. The hematite ore charged into the treating furnace showed by analysis an Fe content of 54.5%. No analysis of the reduction balls produced by the primary treatment was made.

240 pounds of the reduction balls, hot from the primary treatment were charged hot into a cupola type furnace which had been brought to a temperature of about 2900° F. During the cupola melt a total of 90 pounds of coke and 27 pounds of lime were used.

When the furnace was tapped the molten iron from the reduction balls was run into a pig which weighed 181 pounds, to show a recovery of 96.5% the original Fe content of the ore charged into the treating furnace.

I have found that by charging the reduction balls, or masses, into the cupola type furnace while they are still hot from the primary treating furnace, I am able to increase the throughput of the cupola by as much as 30% as compared with a cupola melt in which the reduction balls are cooled before charging. Advantage similarly is gained by charging the reduction balls, or masses, while still hot from the primary treatment into a bath type furnace.

To summarize the process with respect to treatment in the primary furnace, the success of that process depends upon establishing in the treating chamber and in contact with a batch of iron oxide therein the above-described input atmosphere substantially devoid of oxygen in the form of free $O_2$ and containing CO and free carbon which latter becomes luminous at the input temperature, that temperature being in the approximate range of 1900° F. to 2300° F.; and in the maintenance of that atmosphere and temperature throughout the continuance of the treatment coupled with the maintenance of superatmospheric pressure in the treating chamber.

With those fundamental conditions established and maintained stable throughout the treatment, the treatment can be carried as far as is necessary to give a desired product for the selected secondary treatment in which molten iron is recovered and can be promoted and varied at will, as in the manner which has been described above.

I claim as my invention:

1. The method of treating iron ore by subjecting a batch of the said ore and solid carbon to an input combustion atmosphere substantially devoid of free $O_2$ and containing CO in a relatively short, closed treating chamber declining from its combustion atmosphere entering end, continuing the input of a combustion atmosphere throughout the duration of the treatment and maintaining a reducing atmosphere and temperature substantially uniform throughout the length and diametric area of the declining treating chamber under control of the said input combustion atmosphere, maintaining superatmospheric pressure within the said treating chamber, and rotating the treating chamber at slow speed to position the batch and its products chiefly in the lower region of the said chamber, to agitate the batch and to agglomerate the batch into coherent masses or balls containing the products of the treatment.

2. The method of treating iron ore by subjecting a batch of the said ore to an input combustion atmosphere substantially devoid of free $O_2$ and containing CO in a relatively short, closed treating chamber declining from its combustion atmosphere entering end, continuing the input of a combustion atmosphere throughout the duration of the treatment and maintaining a reducing atmosphere and temperature substantially uniform throughout the length and diametric area of the declining treating chamber under control of the said input combustion atmosphere, maintaining superatmospheric pressure within the said treating chamber, and rotating the treating chamber at slow speed to position the batch and its products chiefly in the lower region of the said chamber, to agitate the batch and to agglomerate the batch into coherent masses or balls containing the products of the treatment.

3. The method of treating iron ore by subjecting a batch of the said ore finely divided to an input atmosphere substantially devoid of free $O_2$ and containing CO in a relatively short, closed treating chamber declining from its combustion atmosphere input end, under the said input atmosphere raising the temperature of the said batch of ore to approximately a reducing order, when the batch of ore has been raised to such temperature introducing and igniting in the batch at least one charge of finely divided solid carbon, continuing the treatment with a reducing atmosphere and temperature substantially uniform throughout the length and diametric area of the declining chamber under the control of the said input atmosphere, and slowly rotating the treating chamber thoroughly to mix the ore and solid carbon in a batch collected chiefly in the lower end of the said treating chamber, to agitate the batch for uniform exposure to the reducing conditions in the said treating chamber and to agglomerate the products of reduction into reduction masses or balls.

References Cited in the file of this patent

UNITED STATES PATENTS

| Number | Name | Date |
|---|---|---|
| 852,611 | Perkins et al. | May 7, 1907 |
| 2,349,688 | Wood | May 23, 1944 |
| 2,526,658 | Harman et al. | Oct. 24, 1950 |